2,789,947
Patented Apr. 23, 1957

2,789,947

DRILLING MUDS

Karl E. Fischer, Ahrensburg, and Herbert Sydow, Hamburg, Germany

No Drawing. Application October 27, 1953, Serial No. 388,692

Claims priority, application Germany March 10, 1951

5 Claims. (Cl. 252—8.5)

The present invention relates to improved drilling muds and more particularly to drilling muds having the water binding property thereof increased.

The present invention is a continuation-in-part of our copending application Serial No. 275,662, filed March 8, 1952, and entitled "Depolymerized Alginic Acid Derivatives."

In the rotary method of drilling, mud is circulated down the drill stem and up the annular space between the drill stem and the wall of the hole. The purposes of the mud are to provide a means of preventing "blowouts" by applying a hydrostatic pressure on gas or oil sands greater than the formation pressure, carrying the cuttings produced by the drill on the hole and allowing them to settle in the mud pit, preventing "freezing" of the bit and the drill stem in the hole, and sealing off the formations penetrated so that it will neither flow into the coarser strata causing loss of mud and perhaps a blowout, nor filter into the finer grain formations unduly thickening the mud and forming on the walls of the hole too thick a filter cake which may seriously interfere with drilling operations.

In addition, a good drilling mud acts as a lubricant and dissipator of heat for the bit and drill stem.

The foregoing functional requirements impose severe limits on the properties of a drilling mud, limits which in fact are rarely completely met in ordinary drilling muds.

Drilling mud is usually made largely from clays, or shales and mudstones capable of disintegration in water to form a clayey mass. The term "drilling muds" as used throughout the present specification and claims is meant to include all types of clayey suspensions of clays, shales, and/or mudstones and the like commonly utilized for the purpose of a rotary or drilling mud. The "solids" refers to the solid particles of clay and the like suspended in the fluid, the whole forming the drilling mud.

At the beginning, drillers used to trust to the well for making adequate mud supplies. However it has been found that in general this is insufficient and at the present time drilling mud is actually manufactured.

In addition to clay, other material have been used in the preparation of rotary or drilling muds, i. e. colloidal substances to improve the quality of the mud or to enable inferior or clayey soil to be used. In addition, heavy materials such as barytes and iron oxide were utilized to increase the weight of the mud and chemicals were added to alter the viscosity.

Basically, clay or shale is mixed with water to give a mud of sorts. Sometimes this is done at the well itself. In argillaceous strata this results in the making of relatively good mud. When external supplies are needed, clay or shale are dumped in the pit, water added and the mud mixed.

Generally however drilling mud is prepared by mechanical means by steam jetting, in a paddle mixer, by hydraulicking utilizing a high pressure jet of water or dilute mud, in a hopper mixer, or by combinations thereof.

The physical properties of the drilling mud are extremely important and among the most important physical properties which are tested to determine the value of a particular drilling mud are: specific gravity, viscosity, thixotropy, surface tension, water separation, differential settling, salinity, electrical conductivity, acidity or alkalinity, sand content, colloid content and plastering power.

Many different substances have been added to drilling muds to improve one or more of the above-enumerated physical properties of the drilling mud so as to make the same more suitable for different purposes. For example, alkaline tannates and higher sodium phosphates have been used as thinning agents, barium sulfate and iron oxide have been used to increase the specific gravity, bentonite has been added to improve the colloidal properties, sodium silicate-sodium chloride solutions have been used to overcome the difficulties of flocculation due to excess amounts of salts, alcohols, acetone and similar solvents have been used to eliminate "gas-cuttings" i. e. the formation of stable foam which greatly reduces the effective weight of the mud, and starches and gums and other agents such as gum tragacanth, casein and sodium silicate have been used as stabilizing agents for the muds.

However, until the present time, none of the additions utilized to increase the stability of drill muds has proved to be sufficiently suitable. The stability of a drilling mud is measured principally by the tendency for water to separate from the mud and none of the previous additions to drilling mud has been able to sufficiently control this tendency.

It is therefore an object of the present invention to provide a means of stabilizing drilling mud.

It is another object of the present invention to provide a means whereby the water binding property of the drilling mud is increased so that the drilling mud is made more stable.

Other objects and advantages of the present invention will be apparent from the further reading of the specification and of the appended claims.

We have discovered that drilling mud may be conditioned so as to increase the water binding property thereof and stabilize the same by the addition to a drilling mud of a minor proportion of a partially depolymerized alginic acid derivative. Amounts of depolymerized alginic acid as low as 0.01–1.0% by weight of the drilling mud have been found to give sufficient stability and water binding property to the drilling mud. Although larger amounts may be utilized, for reasons of economy it is of course desirable to utilize as little as possible of the alginic acid derivative and it is for this reason that between 0.01–1.0% by weight is preferred according to the present invention, good results having been obtained with these low amounts.

Alginic acid itself, which is a polymannuronic acid and which is obtained from seaweed, is not suitable for the conditioning of drilling mud according to the present invention because of the high viscosity thereof. It was surprising therefore that lower polymers of mannuronic acid produced by the depolymerization of alginic acid particularly as described in our copending application Serial No. 275,662 would not only be much less viscous but would also greatly improve the stability of a drilling mud.

The depolymerization can be carried out for example by treating an aqueous solution or jelly, either with an oxidizing agent at a pH of 7 or more, or with a reducing agent at a pH of less than 7, the oxidizing and reducing agents as depolymerization agents at the pH of the reaction solution. These depolymerization agents are employed in a minor proportion and the reaction solution treated therewith at a raised temperature. As examplatory of depolymerization agents are hydrogen peroxide, air and the like as oxidizing agents and hydrazine sulphate and the like as reducing agent.

The depolymerization of the alginic acid derivative is accomplished by treating an alkali metal alginate solution of any concentration at a pH of 7 or more with air, while warming and stirring the solution. It is preferable, however, to use aqueous solutions or jellies of 5-20% of a soluble alginic acid derivative. This aqueous solution is then treated with a weak alkali so as to raise the pH of the solution to about 9 and the resulting solution is then treated with about 0.01% of hydrogen superoxide solution. Likewise, an excellent reaction is produced by treating a 5-20% solution of a soluble alginic acid derivative in water with acid so as to lower the pH to about 5 and then with about 0.1% hydrazine sulphate. The reactions are preferably carried out at a temperature of about 100° C.

Normal alginates contain about 100 mannuronic acid molecules per molecule of alginate and it has been found according to the present invention that partially depolymerized alginates containing between 5-20 molecules, and preferably 10 molecules, of mannuronic acid per molecule of depolymerized alginate give the best results in the conditioning of the drilling mud.

It is to be noted that the depolymerized alginic acid derivative utilized for the conditioning of drilling mud according to the present invention is truly a depolymer of the original alginic acid derivative retaining the chemical properties of the original substance. However since the number of monomers units is reduced, it follows that a greater amount of heavy metals such as calcium would be necessary in order to precipitate the depolymerized alginic acid than would be necessary for the original alginic acid. This lower sensitivity to precipitation by metallic salts, which are present in most drilling muds, is of great advantage for the present invention.

In fact due to the high lime sensitivity of the known alginates, the use of the known soluble salts of alginic acid, i. e. sodium alginate, for the treatment of drilling muds has been unsuccessful. However, the addition of the depolymerized alginic acid derivative to the drilling mud removes all known disadvantages in the conditioning of drilling muds.

It is preferred to add the depolymerized alginic acid derivative to the drilling mud in the form a 5-20% solution. Because of the depolymerization of the alginic acid derivative, the 5-20% solution is not too viscous for addition to the drilling mud and it serves as a convenient means of distributing the partially depolymerized alginic acid derivative throughout the drilling mud. The amount of solution added is such that the resulting drilling mud contains between 0.01-1.0%, and preferably between 0.05-1.0%, by weight of dry alginate.

It was further found, according to the present invention, that the results obtained by the addition of the depolymerized alginic acid derivative to the drilling can be greatly improved by the further addition, before, with, or after the addition of the depolymerized alginic acid derivative, of a viscosity-lowering substance, such as sodium carbonate, tannic acid, tannic acid derivatives, phosphates, etc. This combined addition results in an increase in the desired properties of the drilling mud, which increase is not merely additive but is actually highly synergistic.

Furthermore, it has been found, that the condition of the drilling mud, especially the water-binding properties thereof, is still further improved and the stabilization lasts for a longer time, if in addition to the depolymerized alginate and the possible addition of viscosity-lowering substances, a further addition of a reducing agent is made, for example polyoxybenzol, hydroquinone, sulphides, and aldehydes such as formaldehyde, benzaldehyde and the like.

A further synergistic result is obtained by the addition of known polymerized substances which are used for the conditioning of drilling mud, for example cellulose glycolate, having the trade name of Tylose, in combination with a reducing agent of the above mentioned type, and in further combination with a depolymerized alginic acid derivative.

The depolymerized alginic acid derivative may be added to a suspension of clay and water in the manufacture of drilling mud at a plant for this purpose. It is also possible to add the depolymerized alginic acid derivative directly to the clay or to the water and then to form a suspension of the mixture of clay, alginic acid derivative and water.

It is also possible to add the depolymerized alginic acid derivative to circulating mud during the drilling operation or to an already prepared drilling mud which is circulated during the drilling operation.

The following tests were carried out to illustrate the results obtainable by the addition of a depolymerized alginic acid derivative to a drilling mud according to the present invention, the scope of the present invention not however being limited to the specific values given in the tests:

In the description of the tests the "German Andree Test" is mentioned. This is a filter plate test which can be used exactly like filtration in the Baroid press (cm.³ of filtrate) as a measure of the water binding ability of the bore flushing or drilling mud. What is measured is the time in seconds in which a round Schleicher and Schüll the filter No. 595, having a diameter of 5.5 cm. is wetted to its border after the laying on of a predetermined amount of drilling mud which is held by a cylinder with open upper and lower ends. Consequently, the numerical values obtained with the Andree Test are inversely proportional to the number of cubic centimeters of filtrate measured in the Baroid press.

A. A clay drilling mud resulting from oil drilling, which was unusable owing to the salt content, showed the following results in filtration tests:

| | |
|---|---|
| German Andree test_____sec__ | 150 |
| Thickness of filter cake_____mm__ | 8 |
| Filtrate (cc.) 30 min_____ | 7.4 |
| pH _____ | 6 |

A sample of the same mud was treated with 4% of a non-depolymerized sodium alginate 5% solution, as well as with 0.4% hexametaphosphate. The results obtained were as follows:

| | |
|---|---|
| German Andree test_____sec__ | 450 |
| Thickness of filter cake_____mm__ | 5 |
| Filtrate (cc.) 30 min_____ | 5 |
| pH _____ | 7 |

A third sample of the same mud was treated with 4% of a 5% solution of depolymerized sodium alginate, as well as with 0.4% sodium hexametaphosphate. The results obtained were as follows:

| | |
|---|---|
| German Andree test_____sec__ | 600 |
| Thickness of filter cake_____mm__ | 3 |
| Filtrate (cc.) 30 min_____ | 2.8 |
| pH _____ | 7 |

The depolymerized alginate used according to the present invention is extremely effective in drilling operations as an additive to the drilling mud.

*Table 1*

The effect of depolymerized alginates in comparison to non-depolymerized alginates, cellulose glycolate and phosphate on a clay drilling mud containing 3.5% salts, was compared as follows:

| | | | | | | |
|---|---|---|---|---|---|---|
| Depolymerized alginate | | 0.5 | | | 0.25 | |
| Non-depolymerized alginate | 0.5 | | | | | |
| Cellulose glycolate | | | 0.5 | | | 0.5 |
| Phosphate | | | | 0.8 | 0.8 | 0.8 |
| Filtrate (cc.) 30 min | 30 | 18.8 | 24 | 36.5 | 12.5 | 21.5 |
| Thickness of filter cake (mm.) | 9 | 5 | 5 | 9 | 3.5 | 4.5 |
| German Andree Test (sec.) | 180 | 530 | 210 | 180 | 1,400 | 450 |
| Viscosity in Marsh funnel (sec.) | 185 | 400 | 80 | 80 | 87 | 66 |

Table 2

The effect of depolymerized alginates in comparison to non-depolymerized alginates and cellulose glycolate on a salt-free clean clay drilling mud was compared as follows:

| | | | |
|---|---|---|---|
| Depolymerized alginate | 0.1 | | |
| Non-depolymerized alginate | | 0.1 | |
| Cellulose glycolate | | | 0.1 |
| Filtrate (cc.) 30 min | 16.8 | 8.5 | 14.9 | 14.5 |
| Thickness of filter cake (mm.) | 2 | 1 | 2 | 2 |
| German Andree Test (sec.) | 240 | 1,100 | 550 | 330 |

Table 3

The stabilizing effect of formaldehyde with depolymerized alginate, cellulose glycolate with and without the simultaneous addition of phosphate, was tested to determine the conditioning effect on drilling mud. Results are as follows:

| Alginate depolym. | Cellulose glycolate | Phosphate | Formaldehyde 40% | Speed of filtration according to Andree in sec. after— | |
|---|---|---|---|---|---|
| | | | | 0 days | 10 days |
| | | | | | 240 |
| 0.1 | | | | 1,800 | 200 |
| 0.1 | | | 0.02 | 1,600 | 600 |
| | 0.5 | | | 700 | 410 |
| | 0.5 | | 0.02 | 1,500 | 1,260 |
| 0.06 | | 0.2 | | 2,000 | 310 |
| 0.06 | | 0.2 | 0.02 | 2,000 | 2,000 |
| | 0.5 | 0.2 | | 150 | 370 |
| | 0.5 | 0.2 | 0.02 | 1,300 | 1,080 |

Table 1 shows that a salt-containing drilling mud with poor water binding properties, through the addition of 0.5% depolymerized alginate, greatly improves the water-binding properties as compared to the addition of the same amount of cellulose glycolate or by the addition of the same amount of phosphate. Non-depolymerized alginate is not very useful for this purpose because of the high salt, particularly lime-content, of the drilling mud which causes precipitation of the alginate. In combination with the phosphate, the water-binding property of the drilling mud with 0.25% of depolymerized alginate is much better than the combination of a double amount of cellulose glycolate with the phosphate.

Table 2 shows the effect on a salt-free clay drilling mud. This table also shows the greater water-binding properties of drilling mud when treated with depolymerized alginate as compared to treatment with the same amount of non-depolymerized alginate or of cellulose glycolate.

Table 3 shows the length of the stabilization period of a clay drilling mud treated with depolymerized alginate and formaldehyde, with and without an addition of phosphate. The drop in the water-binding property of the drilling mud after 10 days is in all cases, even with cellulose glycolate alone, improved by the addition of formaldehyde.

While the invention has been illustrated and described as embodied in drilling muds, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A conditioned drilling mud, comprising an aqueous suspension-type drilling mud having distributed therethrough at least 0.01% by weight of the weight of the drilling mud of a partially depolymerized alginic acid derivative having about 5–20 molecules of mannuronic acid per each molecule of said partially depolymerized alginic acid derivative, whereby the water binding property of said drilling mud is increased.

2. A conditioned drilling mud, comprising an aqueous suspension-type drilling mud having distributed therethrough about 0.01–1.0% by weight of the weight of the drilling mud of a partially depolymerized alginic acid derivative having about 5–20 molecules of mannuronic acid per each molecule of said partially depolymerized alginic acid derivative, whereby the water binding property of said drilling mud is increased.

3. A conditioned drilling mud, comprising an aqueous suspension-type drilling mud having distributed therethrough at least 0.01% by weight of the weight of the drilling mud of a partially depolymerized alginic acid derivative having about 5–20 molecules of mannuronic acid per each molecule of said partially depolymerized alginic acid derivative and a viscosity-reducing agent, whereby the water binding property of said drilling mud is increased and the thixotropy thereof is simultaneously maintained.

4. A conditioned drilling mud, comprising an aqueous suspension-type drilling mud having distributed therethrough at least 0.01% by weight of the weight of the drilling mud of a partially depolymerized alginic acid derivative having about 10 molecules of mannuronic acid per each molecule of said partially depolymerized alginic acid derivative, whereby the water binding property of said drilling mud is increased.

5. A conditioned drilling mud, comprising an aqueous suspension-type drilling mud having distributed therethrough about 0.01–1.0% by weight of a partially depolymerized alginic acid derivative having about 10 molecules of mannuronic acid per each molecule of said partially depolymerized alginic acid derivative, whereby the water binding property of said drilling mud is increased.

References Cited in the file of this patent

UNITED STATES PATENTS

| | | |
|---|---|---|
| 2,174,027 | Ball | Sept. 26, 1939 |
| 2,612,498 | Alburn | Sept. 30, 1952 |
| 2,638,469 | Alburn | May 12, 1953 |
| 2,638,470 | Alburn | May 12, 1953 |